US008301165B2

(12) United States Patent
Hu et al.

(10) Patent No.: US 8,301,165 B2
(45) Date of Patent: Oct. 30, 2012

(54) METHOD, DEVICE AND SYSTEM FOR OBTAINING USER EQUIPMENT LOCATION INFORMATION

(75) Inventors: Weihua Hu, Shanghai (CN); Zhongping Chen, Shanghai (CN); Wenfu Wu, Shanghai (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/195,415

(22) Filed: Aug. 1, 2011

(65) Prior Publication Data

US 2011/0287785 A1 Nov. 24, 2011

Related U.S. Application Data

(63) Continuation of application No. PCT/CN2010/070540, filed on Feb. 5, 2010.

(30) Foreign Application Priority Data

Feb. 5, 2009 (CN) .......................... 2009 1 0006176
Mar. 16, 2009 (CN) .......................... 2009 1 0129621

(51) Int. Cl.
*H04M 11/04* (2006.01)
*H04W 24/00* (2009.01)
(52) U.S. Cl. ................ 455/456.2; 455/404.2; 455/456.1
(58) Field of Classification Search ............... 455/404.2, 455/414.1, 414.2, 456.1, 456.2, 456.3
See application file for complete search history.

(56) References Cited

U.S. PATENT DOCUMENTS

| 2010/0075651 | A1* | 3/2010 | Hallenstal et al. | 455/418 |
| 2010/0189035 | A1* | 7/2010 | Pehrsson et al. | 370/328 |
| 2010/0323700 | A1* | 12/2010 | Bachmann et al. | 455/436 |
| 2011/0143771 | A1* | 6/2011 | Edge et al. | 455/456.1 |
| 2011/0280217 | A1* | 11/2011 | Drevon et al. | 370/331 |

FOREIGN PATENT DOCUMENTS

| CN | 101175323 A | 5/2008 |
| CN | 101350952 A | 1/2009 |
| WO | WO 2009/018785 A1 | 2/2009 |
| WO | WO 2010/088860 A1 | 8/2010 |

OTHER PUBLICATIONS

ETSI (p. 25-26, Section 7.4, Figure 7.4-1, ETSI TS 123 272 V8.2.0 (Jan. 2009)).*
ETSI-B.2.3 ((p. 40-42, Section B.2.3 Mobile Terminating Call, Figure B.2.3-1, ETSI TS 123 272 V8.2.0 (Jan. 2009)).*

(Continued)

*Primary Examiner* — Kent Chang
*Assistant Examiner* — Nelson Rosario
(74) *Attorney, Agent, or Firm* — Finnegan, Henderson, Farabow, Garrett & Dunner LLP

(57) ABSTRACT

The invention provides a method, device, and system for obtaining user equipment (UE) location information. The method includes: an interworking entity (IWF) receives UE location information reported by a mobility management entity (MME); the IWF determines trusted UE location information according to the UE location information reported by the MME; and the IWF interacts with a UE or a mobile switching center (MSC) according to the trusted UE location information. With the method, device, and system, it is ensured that the MSC can obtain trusted and accurate UE location information in a circuit switched over packet switched (CSoPS) architecture.

10 Claims, 7 Drawing Sheets

OTHER PUBLICATIONS

"3rd Generation Partnership Project; Technical Specification Group Services and System Aspects; Study on Circuit Switched (CS) domain services over evolved Packet Switched (PS) access; Stage 2 (Release 9)," 3GPP Standard; 3GPP TR 23.879, 3rd Generation Partnership Project (3GPP), Mobile Competence Centre; 650, Route Des Lucioles; F-06921 Sophiaantipolis Cedex; France, No. V1.2.0, Jan. 1, 2009, pp. 1-61.

Supplementary European Search Report, Communication regarding the transmission of the European Search Report, and European Search Opinion for EP Application No. 107382160.0, mailed Dec. 14, 2011.

"Voice over LTE via Generic Access; Stage 2 Specification; Phase 1," V.o.L.G.A. Stage 2 V0.0.1 (Mar. 6, 2009) Technical Specification, (47 pages).

"Addition of an alternative to CS over PS," 3GPP TSG SA WG2 Meeting #69, Nov. 17-21, 2008, Miami, Florida TD S2-087575 (14 pages).

"CS Fallback solution with SRVCC Alt-E," 3GPP TSG SA WG2 Meeting #62, Jan. 14-18, 2008, Marina Del Rey, USA, TD S2-080187 (7 pages).

"SR-VCC—Alternative E enhancements," 3GPP TSG SA WG2 Architecture—S2#58, Jun. 25-29, 2007, Orlando, USA S2-072434 (6 pages).

English Translation of the Written Opinion of the International Searching Authority of International Application No. PCT/CN2010/070540, mailing date of May 6, 2010 (4 pages).

International Search Report for International Application No. PCT/CN2010/070540; mailed May 6, 2010; Chinese version included.

First Chinese Office Action (Translation) of Chinese Application No. 200910129621.9; mailed Feb. 29, 2012; Chinese version included.

* cited by examiner

METHOD, DEVICE AND SYSTEM FOR OBTAINING USER EQUIPMENT LOCATION INFORMATION

CROSS-REFERENCE TO RELATED APPLICATIONS

This application is a continuation of International Application No. PCT/CN2010/070540, filed on Feb. 5, 2010, which claims priority to Chinese Patent Application No. 200910006176.7, filed on Feb. 5, 2009 and Chinese Patent Application No. 200910129621.9, filed on Mar. 16, 2009, all of which are hereby incorporated by reference in their entireties.

FIELD OF THE INVENTION

The present invention relates to the communication field, and in particular, to a method, device and system for obtaining user equipment (UE) location information.

BACKGROUND

A circuit switched (CS) domain mainly processes voice services. The signaling plane control entity in the CS domain is a mobile switching center (MSC) or a visitor location register (VLR). A base station subsystem (BSS), which is a radio access network element in a global system for mobile communications (GSM), or general packet radio service (GPRS))/enhanced data rate for GSM evolution (EDGE) radio access network (GERAN) and includes a base station controller (BSC) and a base transceiver station (BTS), is connected to an MSC through an A-interface. A radio network controller (RNC), which is a radio access network element in a universal mobile telecommunications system (UMTS) terrestrial radio access network (UTRAN), is connected to an MSC through an Iu-CS interface.

To tackle the challenges of wireless broadband technologies, an evolved packet system (EPS) is proposed. The core network of the EPS mainly includes three logical function entities, namely, a mobility management entity (MME), a serving gateway (S-GW), and a packet data network (PDN) gateway (P-GW). The MME is responsible for non access stratum (NAS) signaling, NAS signaling encryption, roaming, tracking, allocation of temporary user identities (IDs), and security. The MME corresponds to the control plane part of a serving GPRS support node (SGSN) in a current UMTS system. The S-GW is responsible for local mobility anchors and mobility anchors in a 3rd Generation Partnership Project (3GPP) system and lawful interception information. The P-GW executes functions such as policy execution, charging, and lawful interception.

Because many services of operators are provided in the CS domain, to implement the existing CS services over a long term evolution (LTE) network, a method for connecting to the CS core network through an EPS network is proposed. The P-GW in the EPS network is connected to an MSC in a traditional CS core network through an interworking function (IWF), where the IWF is capable of simulating the Iu-CS interface or A-interface, for example, through the configuration of the protocol stack corresponding to the Iu-CS interface or A-interface. When a UE intends to communicate with the MSC, the UE sends a message to the IWF and the IWF may convert the received message into the signaling format of the Iu-CS interface or A-interface and send the converted message to the MSC. Thus, the communication between the UE and the MSC is completed. Similarly, the IWF may forward a message received from the MSC to the UE. In this communication mode, the LTE network serves as an interactive channel between the UE and the IWF.

When the MSC implements functions such as tracking, charging, and lawful interception, the MSC needs to know the location information of the UE. In a circuit switched over packet switched (CSoPS) architecture, the location information of the UE is provided for the MSC by the IWF. However, the UE location information recorded in the IWF is provided by the UE. Therefore, if the IWF receives the location information reported by the UE and sends it to an associated MSC, certain risks exist. In the prior communication model, because the UE might be attacked by hackers or use illegal software, the UE is always untrusted.

SUMMARY

To overcome the unreliability of UE location information obtained by the MSC in the prior art, embodiments of the present invention provide a method, device and system for obtaining UE location information.

Embodiments of the present invention provide the following technical solution:

A method for obtaining UE location information includes:
receiving, by an IWF, UE location information reported by an MME;
determining, by the IWF, trusted UE location information according to the UE location information reported by the MME; and
interacting, by the IWF, with a UE or an MSC according to the trusted UE location information.

A device for obtaining UE location information includes:
a location information receiving unit, configured to receive UE location information reported by an MME;
a trusted UE location information determining unit, configured to determine trusted UE location information according to the UE location information; and
a trusted UE location information interacting unit, configured to interact with a UE or an MSC according to the trusted UE location information.

A system for obtaining UE location information includes:
an MME, configured to report UE location information to an IWF; and
the IWF, configured to determine trusted UE location information according to the UE location information and interact with a UE or an MSC according to the trusted UE location information.

BRIEF DESCRIPTION OF THE DRAWINGS

The accompanying drawings are intended for better understanding of the present invention and constitute a part of this application rather than a limitation of the present invention. In the accompanying drawings.

DETAILED DESCRIPTION OF THE EMBODIMENTS

To better explain the purpose, technical solution and merits of the present invention, the embodiments of the present invention are hereinafter described in detail with reference to the accompanying drawings. The exemplary embodiments of the present invention and description thereof are intended for interpreting rather than limiting the present invention.

Embodiment 1

This embodiment of the present invention provides a method for obtaining UE location information. The embodiment is described in detail with reference to an accompanying drawing.

Figure 1:
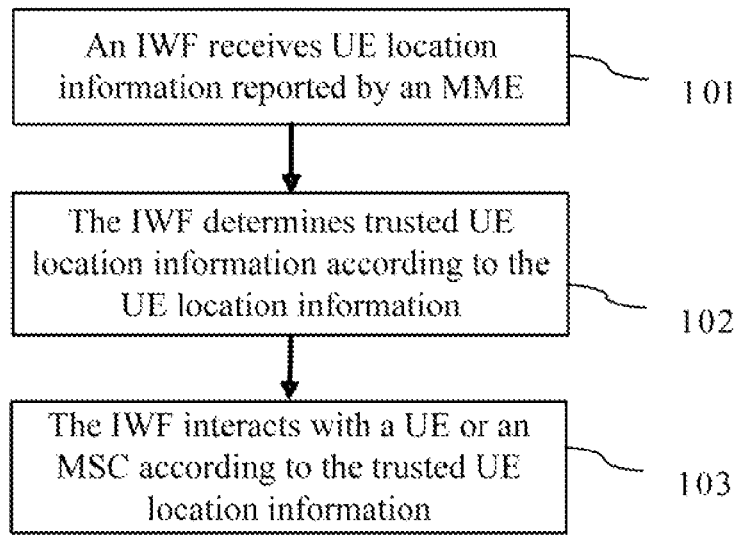
FIG. 1 is a flowchart of a method for obtaining UE location information according to an embodiment of the present invention.

FIG. 1 is a flowchart of the method provided in this embodiment. As shown in FIG. 1, the method for obtaining UE location information includes the following steps:

101. An IWF receives UE location information reported by an MME.

102. The IWF determines trusted UE location information according to the UE location information reported by the MME.

103. The IWF interacts with a UE or an MSC according to the trusted UE location information.

In this embodiment, the UE location information recorded by the MME may be provided by an evolved NodeB (eNodeB) through a known technology, where the eNodeB is an access network management element. For example, when the eNodeB sets up a signaling connection with the MME, the eNodeB provides the UE location information for the MME. The details are omitted here. The UE location information is trusted because it is provided by an access network management element. Then the MME transfers the UE location information to the IWF connected to the MME.

In this embodiment, the UE location information obtained by the IWF from the MME may be UE location information of the EPS network, for example, at least one of an enhanced cell global identity (ECGI) of the UE, a tracking area identity (TAI)/TAI list of the UE, and information of the eNodeB that serves the UE (such as eNodeB ID information); in this case, after the IWF receives the UE location information of the EPS network, the IWF needs to further convert the UE location information into the UE location information of the CS domain, for example, a location area identity (LAI) of the UE and a cell global identity (CGI). When the IWF intends to interact with the MSC subsequently, the IWF provides the stored UE location information of the CS domain for the MSC; for example, when the IWF forwards a NAS message sent by the UE to the MSC, the IWF sends the current location information of the UE to the MSC. In addition, the IWF may provide the converted UE location information of the CS domain for the UE in the register redirect procedure. The involved scenarios are not limited in this embodiment.

In this embodiment, the UE location information obtained by the IWF from the MME may also be the UE location information of the CS domain, for example, the LAI and/or CGI of the UE. In this case, the MME needs to convert the received UE location information of the EPS network into the UE location information of the CS domain first, and directly provide the converted UE location information for the IWF. For example, if the UE location information recorded by the MME is ECGI+TAI, according to the mapping relation between the cell of the EPS network (LTE) and the cell of the CS domain (GERAN/UTRAN) configured by the MME, the MME converts the UE location information ECGI (cell information of the UE) of the EPS network into the CGI (cell information) of the GERAN/UTRAN, or converts the UE location information TAI (tracking area information of the UE) of the EPS network into the LAI (location area information of the UE) of the GERAN/UTRAN.

In this embodiment, the IWF receives the UE location information reported by the MME, and the UE location information may be provided by the MME actively, for example, reported by the MME during the establishment of an association between the MME and the IWF. This method includes: the IWF registers with the MME; the MME accepts the REGISTER message and returns a UE-IWF REGISTER ACCEPT message carrying the UE location information recorded by the MME. Or after the MME and the IWF have established an association and the MME obtains the UE location information, the MME provides the recorded UE location information by sending a newly created message. This embodiment does not limit the name of the newly created message. Especially, when the eNodeB updates the UE location information of the MME, the MME updates the UE location information of the IWF once the MME finds that the stored UE location information is changed. Or the MME provides the UE location information according to the UE location information request message of the IWF. For example, if the UE does not report the UE location information, or if the IWF cannot determine whether the location information reported by the UE is trusted even though the UE reports the location information of the UE, the IWF sends a UE location information request message to the MME; for details, see the third embodiment.

Figure 2:
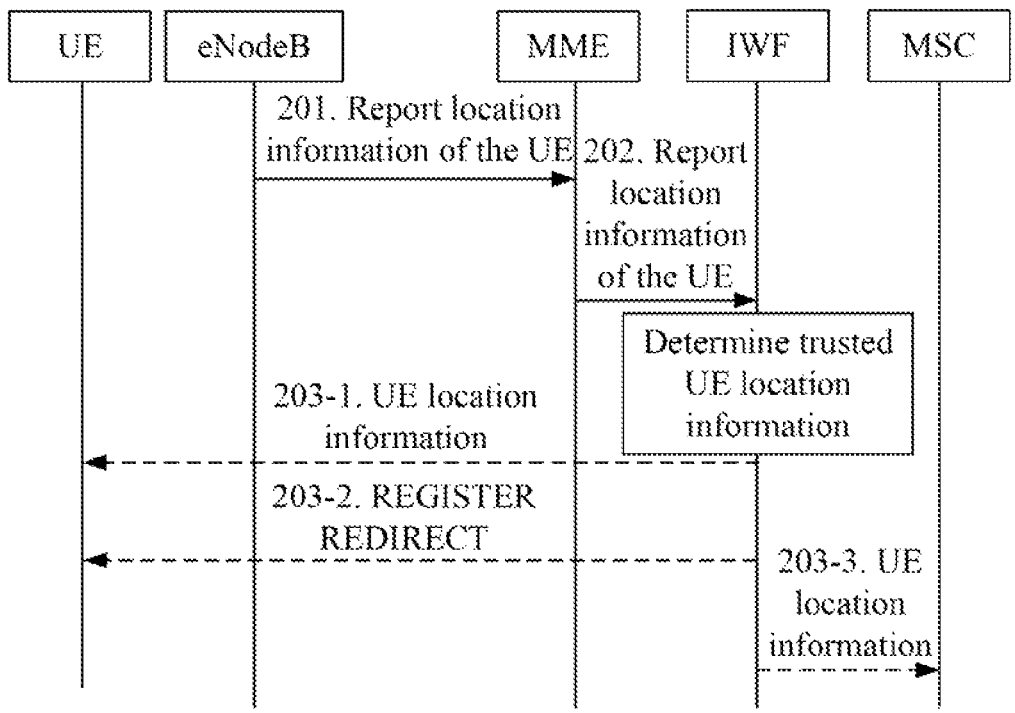
FIG. 2 is a flowchart of interactions between an MME and an IWF according to the embodiment illustrated in FIG. 1.

To make the method of this embodiment clearer, the following describes this embodiment with reference to the flowchart of information interactions between the MME and the IWF. As shown in FIG. 2, the procedure includes the following steps:

201. An eNodeB reports location information of a UE.

In this embodiment, the location information of the UE such as an ECGI and a TAI may be carried in messages over the S1 interface and reported to an MME, for example, an S1-MME control message (Initial UE message), an S1-AP UPLINK NAS TRANSPORT message, a Path Switch Request message, a Handover Notify message, or a Location Report message.

202. The MME obtains the location information of the UE, and reports the location information of the UE to an IWF connected to the MME.

In this embodiment, the location information of the UE is described above and is omitted here.

In this embodiment, the interface between the MME and the IWF such as the currently defined Sv interface does not define the function of reporting the UE location information, that is, no such signaling transfers the location information of the UE. Therefore, the MME may create a new message to carry the location information of the UE for interacting with the IWF. For example, the MME may create a Location Update Request message, which includes the international mobile subscriber identity (IMSI) of the UE, MME ID of the MME, and the location information of the UE, to transfer the location information of the UE.

According to this embodiment, during the establishment of an association between the IWF and the MME, the MME may send a UE-IWF REGISTER ACCEPT message to the IWF, where the message carries the UE location information recorded by the MME.

According to this embodiment, the MME may also report the recorded UE location information according to the location information request message of the IWF after the association between the IWF and the MME is established.

According to this embodiment, the MME may also report the UE location information to the IWF after receiving the UE location information sent by the eNodeB.

The preceding descriptions are examples only and this embodiment is not limited to such examples.

203. After obtaining the UE location information, the IWF determines trusted UE location information, and interacts with the UE or MSC according to the trusted UE location information.

According to this embodiment, the UE location information is trusted because it is provided by the MME; after obtaining the trusted UE location information, the IWF judges whether to continue serving the UE according to the trusted UE location information.

If the IWF can continue serving the UE, in the register or register update procedure initiated to the IWF by the UE, the IWF may provide the UE location information for the UE; for example, the IWF returns a UE-IWF REGISTER ACCEPT or UE-IWF REGISTER UPDATE DOWNLINK message to the UE, where the message carries the location information of the UE and the location information is the LAI of the CS domain (location area information of the UE). As shown in FIG. 2, alter receiving a UE-IWF REGISTER REQUEST or UE-IWF-RC REGISTER UPDATE UPLINK message sent by the UE, the IWF returns a UE-IWF REGISTER ACCEPT or UE-IWF REGISTER UPDATE DOWNLINK message to the UE. For details, see step 203-1. Step 203-1: The IWF sends a UE-IWF REGISTER ACCEPT or UE-IWF REGISTER UPDATE DOWNLINK message carrying UE location information to the UE; in this way, the IWF provides the UE location information for the UE.

If the IWF determines that it cannot continue serving the UE according to the UE location information provided by the MME, in the register or register update procedure initiated to the IWF by the UE, the IWF notifies the UE to perform a register redirect procedure through corresponding response messages, and redirects the UE to another serving IWF; the source IWF sends a UE-IWF REGISTER REDIRECT message to the UE. For details, see step 203-2. Step 203-2: The IWF sends a REGISTER REDIRECT message to the UE, where the message carries the target IWF address information (such as IP address information) so that the UE can address the target IWF. Subsequently, the UE needs to initiate a registration procedure to the target IWF, for example, the registration procedure defined by the IWF; if the serving MSC is also changed, the UE also needs to initiate a location area update (LAU) procedure to register with a new MSC.

In this embodiment, the register or register update procedure initiated to the IWF by the UE may be executed before, during or after steps 201 and 202.

In addition, if the IWF determines that it can continue serving the UE according to the UE location information provided by the MME, the IWF may further report the UE location information to the MSC during the subsequent interaction with the MSC after the IWF obtains the UE location information. For details, see step 203-3. For example, in step 203-3, the IWF may report the UE location information to the MSC through an A-interface or Iu-CS interface message such as a Handover Required message.

The subsequent interaction with the MSC may include the interaction between the UE and the MSC through the IWF.

The disclosure describes the information interaction between the UE and the IWF in three common scenarios. In the scenarios, the IWF provides the obtained trusted UE location information to the UE or MSC, or the IWF redirects the UE to other IWFs. However, the invention is not limited to these scenarios. Other scenarios, in which, during the interaction between the UE and the IWF, the IWF provides the obtained trusted UE location information to the UE or MSC, also fall within the scope of the present invention.

The method of this embodiment may ensure that the IWF obtains trusted UE location information and provides it to the MSC or UE.

Embodiment 2

This embodiment of the present invention provides a method for obtaining UE location information. The embodiment is described in detail with reference to an accompanying drawing.

According to the first embodiment, the location information provided by the MME is trusted but not accurate. According to the prior art, in the present EPS network, when the UE transitions from the idle state to the connected state, the eNodeB provides current ECGI, TAI, and eNodeB ID information of the UE for the MME; if the UE is always in the connected state, the UE location information recorded by the MME is the eNodeB ID; that is, when the connected UE traverses a cell or even a TA, the MME cannot perceive the location change so long as the eNodeB is not changed, namely, the eNodeB ID is not changed. However, the UE can perceive the accurate location information. In the second embodiment, more accurate location information is obtained on the basis of the trusted location information.

Figure 3:
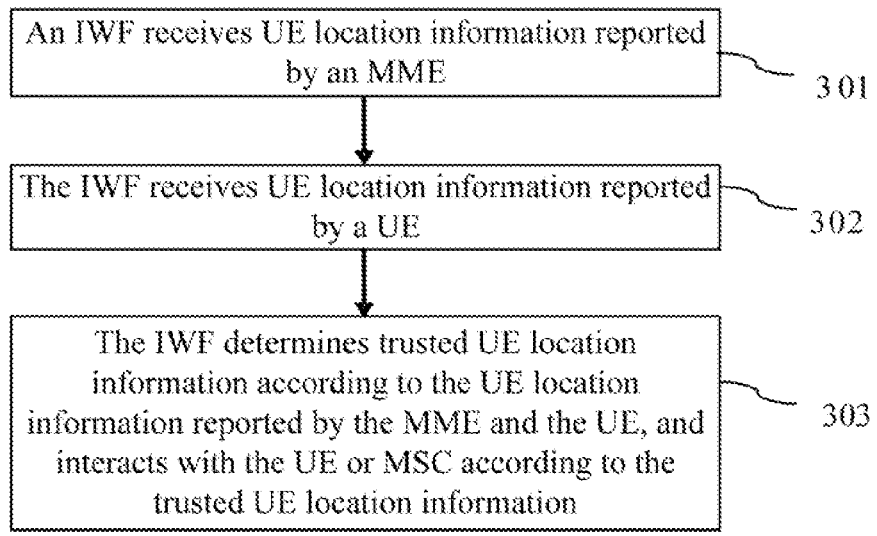
FIG. 3 is a flowchart of a method for obtaining UE location information according to another embodiment of the present invention.

FIG. 3 is a flowchart of the method provided in this embodiment. As shown in FIG. 3, the method for obtaining UE location information includes the following steps:

301. An IWF receives UE location information reported by an MME, where the UE location information is described above and is omitted here.

302. The IWF receives the UE location information reported by a UE, where the UE location information includes an ECGI and/or a TAI.

According to this embodiment, the premise for the interaction between the UE and the IWF is that the UE is in the connected state in the EPS network. When the UE transitions from the idle state to the connected state, the MME obtains the UE location information and provides it for the IWF; the IWF uses the location information as trusted location information. The UE executes the mobility management procedure or session procedure of the CS domain subsequently. Because the interaction between the UE and the MSC needs to be implemented through the IWF, the UE location information may be carried during the interaction with the IWF. This embodiment does not limit the specific signaling involved in the interaction between the UE and the IWF.

Evidently, the time of reporting the UE location information to the IWF by the UE and the MME may not be synchronous.

303. The IWF determines trusted UE location information according to the received UE location information reported by the MME and the UE, and interacts with the UE or an MSC according to the trusted UE location information.

In this embodiment, the UE reports the UE location information to the IWF; the MME reports the UE location information to the IWF; the IWF determines the trusted UE location information according to the location information reported by the UE and the MME.

According to this embodiment, if both the UE and the MME report UE location information, the IWF determines the trusted UE location information by judging whether the UE location information reported by the UE and the UE location information reported by the MME are the same, or judging whether the UE location information reported by the UE is in the management scope of an eNodeB recorded in the UE location information reported by the MME, or judging whether the UE location information reported by the UE is in the management scope of the TA of the UE recorded in the UE location information reported by the MME.

If the location information reported by the UE is the same as or similar to the location information reported by the MME, for example, the UE location information reported by the UE is in the management scope of the eNodeB corresponding to the eNodeB ID, or the UE location information reported by the UE is in the management scope of the TA, the IWF trusts the location information reported by the UE; otherwise, the IWF trusts the location information provided by the MME.

According to this embodiment, because the MME may not report the UE location information in time, after step 301 in this embodiment, the following step is included: The IWF stores the UE location information reported by the MME. In this case, if the UE reports UE location information in time, but the MME does not report UE location information in time, the IWF determines the trusted UE location information by judging whether the UE location information reported by the UE and the stored UE location information are the same, or judging whether the UE location information reported by the UE is in the management scope of the eNodeB recorded in the stored UE location information, or judging whether the UE location information reported by the UE is in the management scope of the TA of the UE recorded in the stored UE location information.

If the location information reported by the UE is the same as or similar to the location information reported by the MME, for example, the location information ECGI and/or TAI reported by the UE is in the management scope of the recorded eNodeB or in the recorded TAI/TAI list, the IWF trusts the location information reported by the UE; otherwise, the IWF trusts the recorded location information provided previously by the MME.

According to this embodiment, if the MME reports the UE location information, but the UE does not report the UE location information, the IWF determines that the UE location information reported by the MME is trusted; however, because the IWF receives no signaling triggered of the UE, the IWF does not interact with the MSC and provide UE location information.

The time of reporting the UE location information by the MME is the same as that of the first embodiment, and is omitted here.

According to this embodiment, the IWF obtains the trusted and accurate UE location information and stores it: when the IWF interacts with the MSC subsequently, the IWF may provide the UE location information for the MSC; when the IWF interacts with the UE subsequently, the IWF may provide the trusted UE location information for the UE or enable the UE to perform a register redirect procedure. For details, see the first embodiment. The details are omitted here.

Figure 4:
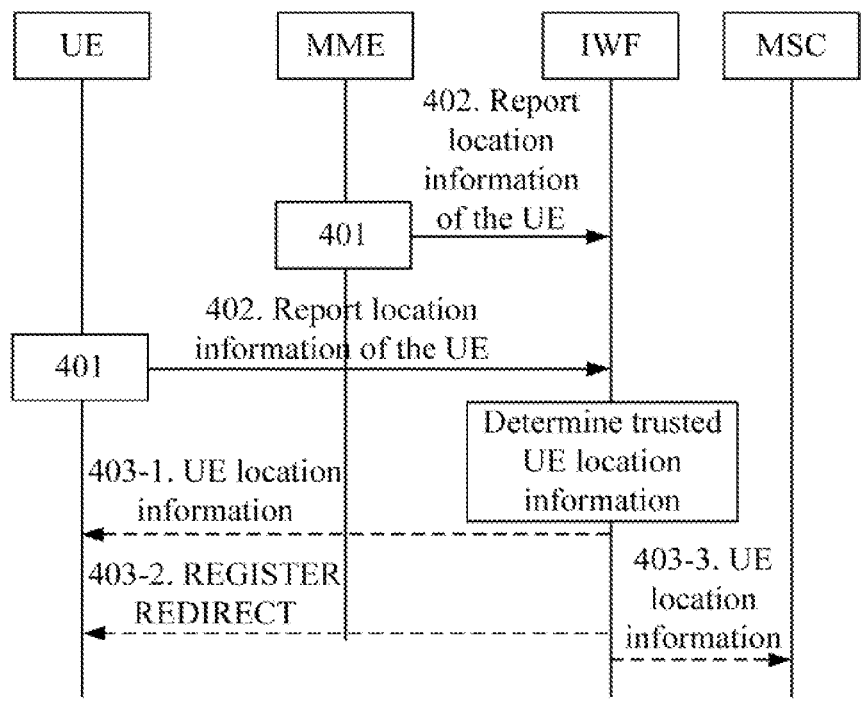
FIG. 4 is a flowchart of interactions between an MME and an IWF according to the embodiment illustrated in FIG. 3.

To make the method of this embodiment clearer, the following describes this embodiment with reference to the flowchart of information interactions between an MME and an IWF. As shown in FIG. 4, the procedure includes the following steps:

401. The UE and the MME interact with the eNodeB to obtain the UE location information.

In this embodiment, the UE and the MME obtain the UE location information in the same way as in the first embodiment, that is, obtain the UE location information by interacting with the eNodeB. The details are omitted here.

402. An IWF obtains UE location information to determine trusted UE location information.

In this embodiment, the IWF obtains the UE location information in the following scenarios:

(1) Both the UE and the MME report the UE location information to the IWF.

In this embodiment, the UE may carry the UE location information in a UE-IWF DISCOVERY REQUEST, UE-IWF REGISTER REQUEST, UE-IWF REGISTER UPDATE UPLINK, UE-IWF REQUEST, or UE-IWF KEEP ALIVE message, and report the UE location information to the IWF. The preceding descriptions are examples only. This embodiment does not limit other messages exchanged between the UE and the IWF for carrying the UE location information and reporting the location information to the IWF. The location information reported by the UE may be the ECGI and/or TAI of the EPS network where the UE is located.

Meanwhile, the MME reports the UE location information to the IWF. The reporting mode is described in the first embodiment and is omitted here.

In this case, the IWF needs to compare the UE location information reported by the UE and the MME. If the UE location information reported by the UE and the UE location information reported by the MME are the same or similar, the IWF regards the UE location information reported by the UE as trusted; during the subsequent interaction with the MSC, the IWF reports the location information to the MSC. If the UE location information reported by the UE is not the same as the UE location information reported by the MME, the IWF regards the UE location information reported by the MME as trusted; during the subsequent interaction with the MSC, the IWF reports the location information to the MSC.

According to this embodiment, during comparison, if the type of the UE location information reported by the UE is the same as the type of the UE location information reported by the MME, for example, both types are ECGI, or TAI/TAI list, the IWF directly compares whether the information reported by the UE and the information reported by the MME are the same; if the types are not the same, for example, the type of the UE location information reported by the UE is ECGI, while the type of the UE location information reported by the MME is TAI/TAI list or is only eNodeB ID, the IWF may compare whether the UE location information reported by the UE is in the management scope of the eNodeB ID or in the management scope of the TAI/TAI list, and if the UE location information reported by the UE is in the management scope of the eNodeB ID or in the management scope of the TAI/TAI list, the IWF regards the UE location information reported by the UE as trusted, or else, the IWF regards the UE location information reported by the MME as trusted.

(2) The UE reports the UE location information to the IWF, but the MME stores only the previously reported UE location information without updating UE location information.

In this embodiment, the UE may carry UE location information in a UE-IWF REGISTER UPDATE UPLINK or UE-IWF REQUEST message, and report the UE location information to the IWF; in this case, the MME does not receive the UE location information reported by the eNodeB; for example, cell handover or TA change occurs because the connected UE moves, while the eNodeB associated with the UE is not changed, and therefore, the eNodeB will not report the UE location information to the MME, and the MME will not continue reporting the UE location information to the IWF.

In this case, the IWF stores the UE location information previously reported by the MME, and needs to compare whether the location information reported by the UE is the same as the stored UE location information, or compare whether the ECGI reported by the UE is in the stored management scope of the eNodeB or in the TAI/TAI list according to the eNodeB ID in the stored UE location information. If the location information reported by the UE is the same as the stored location information or belongs to the management scope of the eNodeB or TAI/TAI list recorded in the stored UE location information, the location information reported by the UE is trusted; during the subsequent interaction with the MSC, the UE location information in the MSC will be updated. If the location information is not the same and does not belong to the management scope of the eNodeB or TAIT-TAI list, the location information is not trusted; if the UE location information needs to be reported to the MSC, the location information recorded previously and not updated will be reported.

(3) The MME reports location information to the IWF, but the UE does not report location information.

In the EPS network, the eNodeB reports UE location information to the MME; for example, the UE transitions from the idle state to the connected state, but no signaling interaction exists between the UE and the IWF (for example, the UE performs a PS service rather than a CS service). In this case, the eNodeB updates UE location information of the MME; then the MME updates UE location information of the IWF; the IWF stores the UE location information reported by the MME; because no signaling triggered is received from the UE, the IWF will not interact with the MSC and provide UE location information.

403. After obtaining the trusted UE location information, the IWF interacts with the UE or MSC according to the trusted UE location information.

According to this embodiment, after obtaining the trusted UE location information, the IWF judges whether to continue serving the UE according to the trusted UE location information.

If the IWF can continue serving the UE, in the register or register update procedure initiated to the IWF by the UE, the IWF returns a UE-IWF REGISTER ACCEPT or UE-IWF REGISTER UPDATE DOWNLINK message to the UE, where the message carries UE location information. The location information is the LAI (location area information of the UE) of the CS domain. As shown in FIG. 4, after receiving a UE-IWF REGISTER REQUEST or UE-IWF-RC REGISTER UPDATE UPLINK message sent by the UE, the IWF returns a UE-IWF REGISTER ACCEPT or UE-IWF REGISTER UPDATE DOWNLINK message to the UE, where the message carries UE location information. For details, see step 403-1. Step 403-1: The IWF sends a UE-IWF REGISTER ACCEPT or UE-IWF REGISTER UPDATE DOWNLINK message to the UE, where the message carries UE location information. In this way, the IWF finishes providing the UE location information for the UE.

If the IWF determines that it cannot continue serving the UE according to the trusted UE location information, the IWF redirects the UE to another serving IWF, and the source IWF sends a UE-IWF REGISTER REDIRECT message to the UE. For details, see step 403-2. Step 403-2: The IWF sends a message to the UE, where the message carries the target IWF address information (such as IP address information) so that the UE can address the target IWF. Subsequently, the UE needs to initiate a registration procedure to the target IWF, for example, the registration procedure defined by the IWF; if the serving MSC is also changed, the UE also needs to initiate a LAU procedure to register with a new MSC.

In this embodiment, the UE may send a UE-IWF REGISTER REQUEST or UE-IWF-RC REGISTER UPDATE UPLINK message to the IWF before, during or after steps 401 and 402.

In addition, if the IWF determines that it can continue serving the UE according to the trusted UE location information, the IWF may also report the UE location information to the MSC during the subsequent interaction with the MSC, for example, through an A-interface or Iu-CS interface message such as a Handover Required message.

The subsequent interaction with the MSC may be the interaction between the UE and the MSC through the IWF.

It should be noted that this embodiment describes the information interaction between the UE and the IWF in only three common scenarios. In the scenarios, the IWF provides the obtained trusted UE location information for the UE or MSC, or enables the UE to perform a register redirect procedure. However, this embodiment does not limit the scenarios. In other scenarios, during the interaction between the UE and the IWF, the IWF provides the obtained trusted UE location information for the UE or MSC, which also falls within the scope of the present invention.

This embodiment considers that although the UE location information provided by the MME is trusted, it is not accurate in a certain scenario. Therefore, a step of comparing UE location information by the IWF is added. In this way, when the UE reports new UE location information to the IWF, but the MME does not report UE location information to the IWF, the IWF may confirm whether the location information reported by the UE is the same as the stored UE location information through comparison, or whether the location information reported by the UE is in the management scope of the recorded eNodeB or TAI/TAI list; if the location information reported by the UE is the same as the stored UE location information through comparison, or the location information reported by the UE is in the management scope of the recorded eNodeB or TAI/TAI list, the IWF regards the location information reported by the UE as trusted, and the IWF provides the updated location information for the MSC or UE subsequently, which ensures that the IWF can obtain trusted and accurate UE location information.

Embodiment 3

This embodiment provides a method for obtaining UE location information. The embodiment is described in detail with reference to an accompanying drawing.

Figure 5:
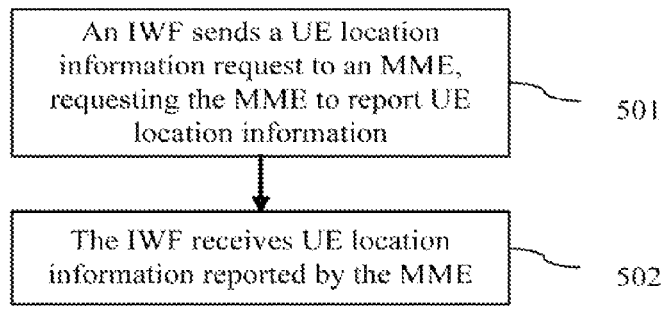
FIG. 5 is a flowchart of a method for obtaining UE location information according to another embodiment of the present invention.

FIG. 5 is a flowchart of the method provided in this embodiment. As shown in FIG. 5, the method for obtaining UE location information includes the following steps:

501. An IWF sends a UE location information request to an MME, requesting the MME to report UE location information.

In this embodiment, the IWF may notify the MME to report accurate and trusted UE location information through the UE location information request in the following cases: the IWF finds that the location information reported by the UE is not the same as the location information reported by the MME; or the IWF cannot compare the UE location information reported by the UE with the location information reported by the MME that is recorded by the IWF because the UE location information reported by the MME is not stored; or the UE does not report the current UE location information, but the IWF needs to obtain the UE location information; or the IWF cannot determine whether the location information reported by the UE is trusted though the UE reports the location information.

In this embodiment, the UE location information request may request the MME to provide the current UE location information, the location information when the cell of the UE is changed, or the location information of the UE reported periodically, which is not limited in this embodiment.

502. The IWF receives a UE location information response message returned by the MME, where the message carries UE location information.

In this embodiment, step 502 is the same as step 101 in the first embodiment and step 301 in the second embodiment, namely, the MME reports UE location information to the IWF, which is omitted here.

According to this embodiment, when the IWF does not require the MME to report UE location information any longer, the IWF may notify the MME to stop reporting UE location information through a Cancel Location Reporting message.

Figure 6:
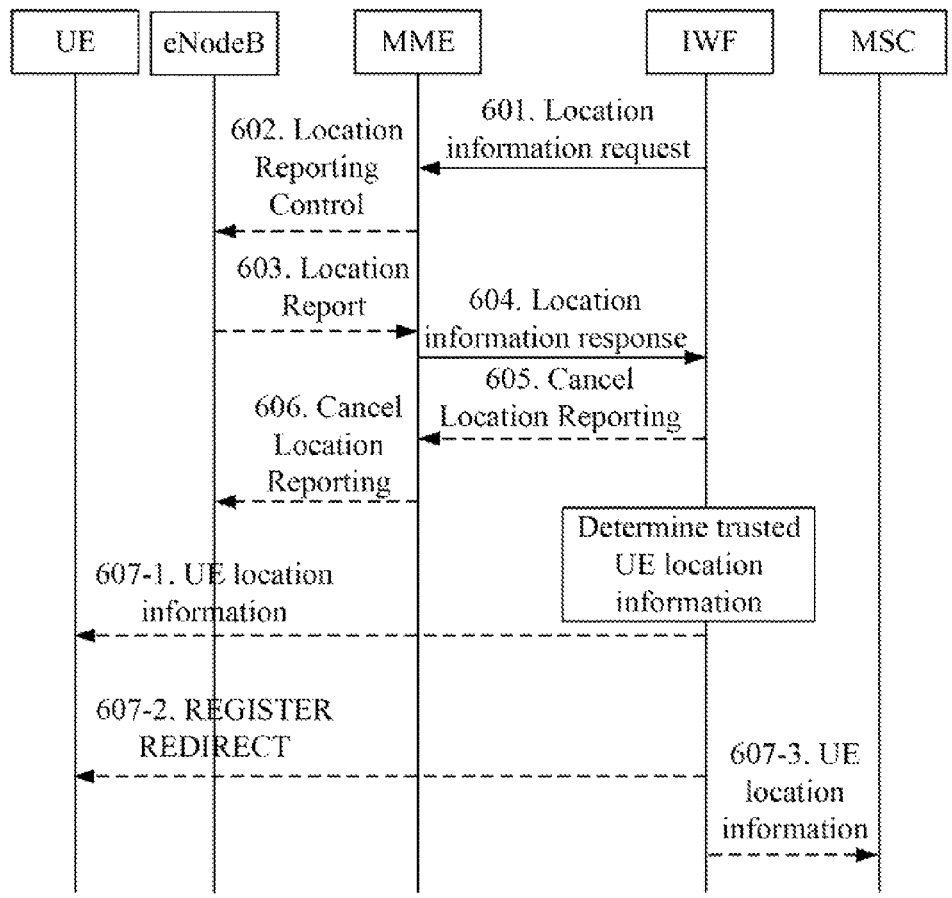
FIG. 6 is a flowchart of interactions between an MME and an IWF according to the embodiment illustrated in FIG. 5.

To make the method of this embodiment clearer, the following describes this embodiment with reference to the flowchart of information interactions between the MME and the IWF. As shown in FIG. 6, the procedure includes the following steps:

601. An IWF requests UE location information from an MME.

In this embodiment, the IWF may create a new message on the Sv interface to transfer the requested UE location information. For example, a Location Request, which may carry the IMSI of the UE, IWF ID, and reporting type, or a Location Reporting Control message, which is not limited in this embodiment.

In this embodiment, the reporting type indicates the mode of reporting UE location information by the MME. The MME may report the current UE location information, the new cell location information when the cell of the UE is changed, or the location information of the UE reported periodically. The reporting type can also indicate the type of the UE location information reported by the MME, for example, ECGI, TAI/TAI list, or eNodeB ID, which is not limited in this embodiment and may also be indicated by other information elements such as a reporting granularity.

602. The MME sends a Location Reporting Control message to an eNodeB.

603. The eNodeB returns a Location Reporting message to the MME, where the message carries UE location information (ECGI+TAI); if the MME has identified the serving eNodeB, the serving eNodeB does not need to return eNodeB ID information.

In this embodiment, if the type of the location information request is eNodeB ID, steps 602 and 603 are unnecessary.

604. The MME returns a UE location information response to the IWF, where the response carries the current location information of the UE.

In this embodiment, the IWF may create a new message on the Sv interface. For example, a Location Response message, which may carry the IMSI of the UE, MME ID, and location information of the UE, or a Location Reporting Control message, which is not limited in this embodiment.

According to this embodiment, if the IWF requires the MME to report UE location information periodically, step 605 may be executed when the IWF does not require the MME to report UE location information any longer.

605. The IWF sends a Cancel Location Reporting message to the MME and stops reporting UE location information.

In this embodiment, the IWF may create a new message on the Sv interface, for example, a Cancel Location Reporting message, which carries the IMSI of the UE and IWF ID. The specific message is not limited in this embodiment.

606. The MME sends a Cancel Location Reporting message to the eNodeB and stops reporting UE location information.

According to this embodiment, the IWF obtains the trusted UE location information and stores it, and during the subsequent interaction with the MSC or UE, the IWF may provide the UE location information for the MSC or UE.

607. After obtaining the UE location information, the IWF determines the trusted UE location information, and interacts with the UE or MSC according to the trusted UE location information.

According to this embodiment, after obtaining the trusted UE location information, the IWF may judge whether to continue serving the UE according to the trusted UE location information.

If the IWF can continue serving the UE, in the register or register update procedure initiated to the IWF by the UE, the IWF returns a UE-IWF REGISTER ACCEPT or UE-IWF REGISTER UPDATE DOWNLINK message to the UE, where the message carries UE location information. The location information is the LAI (location area information of the UE) of the CS domain. As shown in FIG. 6, after receiving a UE-IWF REGISTER REQUEST or UE-IWF-RC REGISTER UPDATE UPLINK message sent by the UE, the IWF returns a UE-IWF REGISTER ACCEPT or UE-IWF REGISTER UPDATE DOWNLINK message to the UE. For details, see step 607-1. Step 607-1: The IWF sends a UE-IWF REGISTER ACCEPT or UE-IWF REGISTER UPDATE DOWNLINK message to the UE, where the message carries UE location information. In this way, the IWF finishes providing the UE location information for the UE.

If the IWF determines that it cannot continue serving the UE according to the trusted UE location information, the IWF redirects the UE to another serving IWF, and the source IWF sends a UE-IWF REGISTER REDIRECT message to the UE. For details, see step 607-2. Step 607-2: The IWF sends a message to the UE, where the message carries the target IWF address information (such as IP address information) so that the UE can address the target IWF. Subsequently, the UE needs to initiate a registration procedure to the target IWF, for example, the registration procedure defined by the IWF; if the serving MSC is also changed, the UE also needs to initiate a LAU procedure to register with a new MSC.

In this embodiment, the UE may send a UE-IWF REGISTER REQUEST or UE-IWF-RC REGISTER UPDATE UPLINK message to the IWF before, during or after the preceding steps.

In addition, if the IWF can continue serving the UE, the IWF may also report the UE location information to the MSC during the subsequent interaction with the MSC, for example, through an A-interface or Iu-CS interface message such as a Handover Required message.

The subsequent interaction with the MSC may be the interaction between the UE and the MSC through the IWF.

Using the method of this embodiment, the IWF requires the MME to provide UE location information; the MME initiates a location reporting procedure to obtain the UE location information, and returns the information to the IWF, which ensures that the IWF can obtain trusted and accurate UE location information and provide it for the MSC or UE.

Embodiment 4

This embodiment of the present invention provides a device for obtaining UE location information. The embodiment is described in detail with reference to an accompanying drawing.

Figure 7:
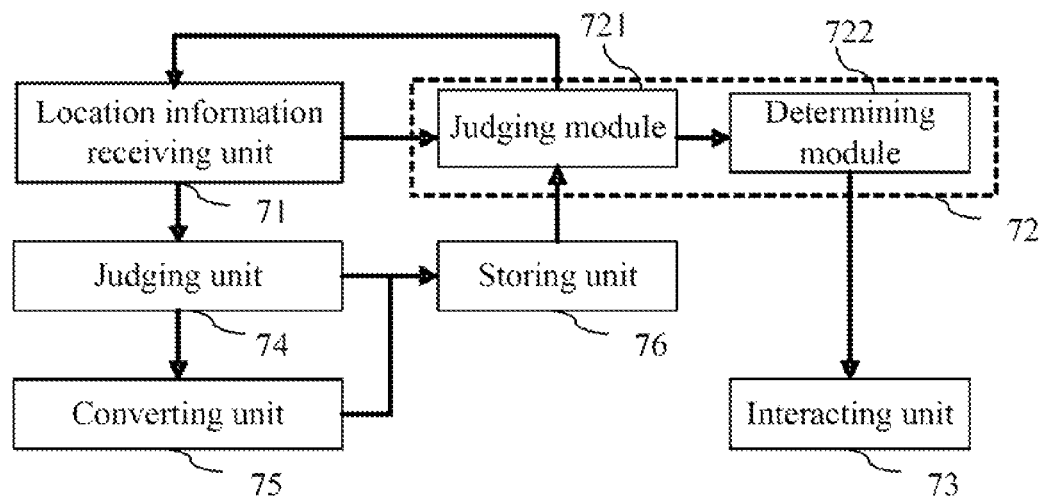
FIG. 7 is a block diagram of a device for obtaining UE location information according to an embodiment of the present invention.

FIG. 7 is a block diagram of the device for obtaining UE location information according to this embodiment. As shown in FIG. 7, the device for obtaining UE location information in this embodiment includes a location information receiving unit 71, a trusted UE location information determining unit 72, and a trusted UE location information interacting unit 73.

The location information receiving unit 71 is configured to receive UE location information reported by an MME and/or a UE, where the UE location information reported by the MME includes an eNodeB ID, and/or an ECGI of the EPS network of the UE, and/or a TAI/TAI list, and the UE location information reported by the UE includes the ECGI of the EPS network of the UE and/or TAI/TAI list.

In this embodiment, the location information receiving unit 71 may be configured to send a UE location information request to the MME, requesting the MME to report UE location information, and receive a UE location information response carrying UE location information from the MME in the following cases: the UE location information reported by the UE is not the same as the UE location information reported by the MME that is stored by the storing unit; the storing unit does not store the UE location information reported by the MME; the UE does not report UE location information while the IWF needs to obtain UE location information; or the UE reports untrusted UE location information.

In this embodiment, the location information receiving unit 71 is further configured to send a REGISTER message to the MME, and receive a UE-IWF REGISTER ACCEPT message carrying UE location information from the MME.

In this embodiment, the location information receiving unit 71 is further configured to receive the UE location information that is obtained and sent by the MME from the eNodeB in time.

The trusted UE location information determining unit 72 is configured to determine trusted UE location information according to the UE location information reported by the MME and the UE location information reported by the UE that are received by the location information receiving unit 71.

The trusted UE location information interacting unit 73 is configured to interact with the UE or MSC according to the trusted UE location information.

According to this embodiment, the device may further include:

a judging unit 74, configured to judge whether the type of the UE location information received by the location information receiving unit 71 is UE location information of the EPS network or UE location information of the CS domain, and directly store the record into a storing unit 76 when the UE location information is UE location information of the CS domain; and a converting unit 75, configured to convert the UE location information of the EPS network into UE location information of the CS domain and store the record into the storing unit 76, according to the judgment result of the judging unit 74, when the UE location information is UE location information of the EPS network.

According to this embodiment, the device may further include:

the storing unit 76, configured to store the UE location information.

In this embodiment, the trusted UE location information determining unit 72 is further configured to determine trusted UE location information according to the UE location information stored by the storing unit 76 and the UE location information reported by the UE.

In this embodiment, the trusted UE location information determining unit 72 further includes:

a judging module 721, configured to: judge whether the UE location information reported by the UE is the same as the UE location information reported by the MME, or judge whether the UE location information reported by the UE is in the management scope of the eNodeB recorded in the UE location information reported by the MME, or judge whether the UE location information reported by the UE is in the management scope of the TA of the UE recorded in the UE location information reported by the MME; or judge whether the UE location information reported by the UE is the same as the UE location information stored by the storing unit 76, or judge whether the UE location information reported by the UE is in the management scope of the eNodeB recorded in the UE location information stored by the storing unit 76, or judge whether the UE location information reported by the UE is in the management scope of the TA of the UE recorded in the UE location information stored by the storing unit 76; and a determining module 722, configured to determine trusted UE location information according to the judgment result of the judging module 721.

For example, when the UE location information reported by the UE is the same as the UE location information reported by the MME, the determining unit 722 regards the UE location information reported by the UE as trusted, or else regards the UE location information reported by the MME as trusted; or when the UE location information reported by the UE is in the management scope of the eNodeB recorded in the UE location information reported by the MME, the determining unit 722 regards the UE location information reported by the UE as trusted, or else regards the UE location information reported by the MME as trusted; or when the UE location information reported by the UE is in the management scope of the TA of the UE recorded in the UE location information reported by the MME, the determining unit 722 regards the UE location information reported by the UE as trusted, or else regards the UE location information reported by the MME as trusted; or when the UE, location information reported by the UE is the same as the UE location information stored by the storing unit 76 the determining unit 722 regards the UE location information reported by the UE as trusted, or else regards the UE location information stored by the storing unit 76 as trusted; or when the UE location information reported by the UE is in the management scope of the eNodeB recorded in the UE location information stored by the storing unit 76, the determining unit 722 regards the UE location information reported by the UE as trusted, or else regards the UE location information reported by the MME as trusted; or when the UE location information reported by the UE is in the management scope of the TA of the UE recorded in the UE location information stored by the storing unit 76, the determining unit 722 regards the UE location information reported by the UE as trusted, or else regards the UE location information reported by the MME as trusted.

According to this embodiment, the device may be included in an IWF, while the IWF may be integrated in a generic access network controller (GANC), which is not limited in this embodiment.

Each component of the device in this embodiment is used to implement the function of each step in the method of the preceding embodiments. Because each step is already described in the preceding embodiments, the details are omitted here.

This embodiment provides a device for obtaining UE location information, which ensures that the MSC can obtain trusted and accurate UE location information in the CSoPS architecture.

Embodiment 5

This embodiment of the present invention provides a system for obtaining UE location information. The embodiment is described in detail with reference to an accompanying drawing.

Figure 8:
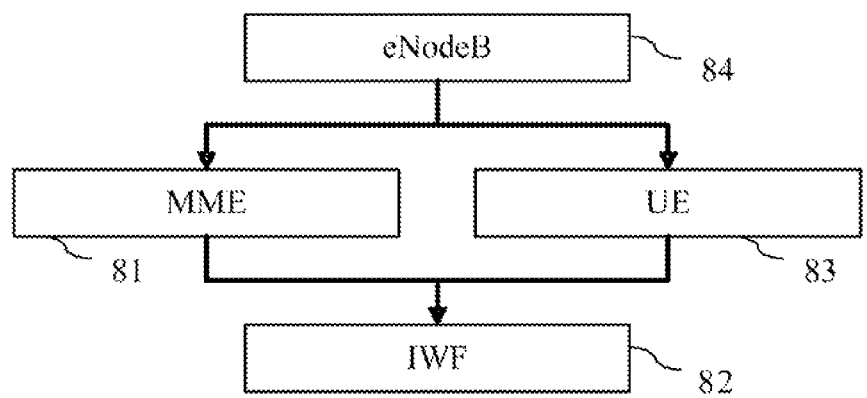
FIG. 8 is a block diagram of a system for obtaining UE location information according to an embodiment of the present invention.

FIG. 8 is a block diagram of the system for obtaining UE location information in this embodiment. As shown in FIG. 8, the system includes an MME 81 and an IWF 82.

The MME 81 is configured to report UE location information to the IWF 82.

The IWF 82 is configured to determine trusted UE location information according to the UE location information and interact with the UE or MSC according to the trusted UE location information.

According to this embodiment, the system may further include:

a UE 83, configured to report UE location information to the IWF 82. In this case, the IWF 82 may further determine trusted UE location information according to the UE location information reported by the MME 81 and the UE location information reported by the UE 83.

According to this embodiment, the system may further include:

an eNodeB 84, configured to report UE location information to the MME 81 or the UE 83.

The functions of the MME 81, the IWF 82, the UE 83, and the eNodeB 84 have been described in detail in the preceding embodiments and are omitted here.

The system for obtaining UE location information in this embodiment ensures that the MSC can obtain trusted and accurate UE location information in the CSoPS architecture.

When the IWF needs to obtain UE location information, the procedure for requesting UE location information from the MME is executed. For the specific procedure, see the ninth and tenth embodiments. The UE location information provided by the MME may be regarded as trusted.

Figure 9:
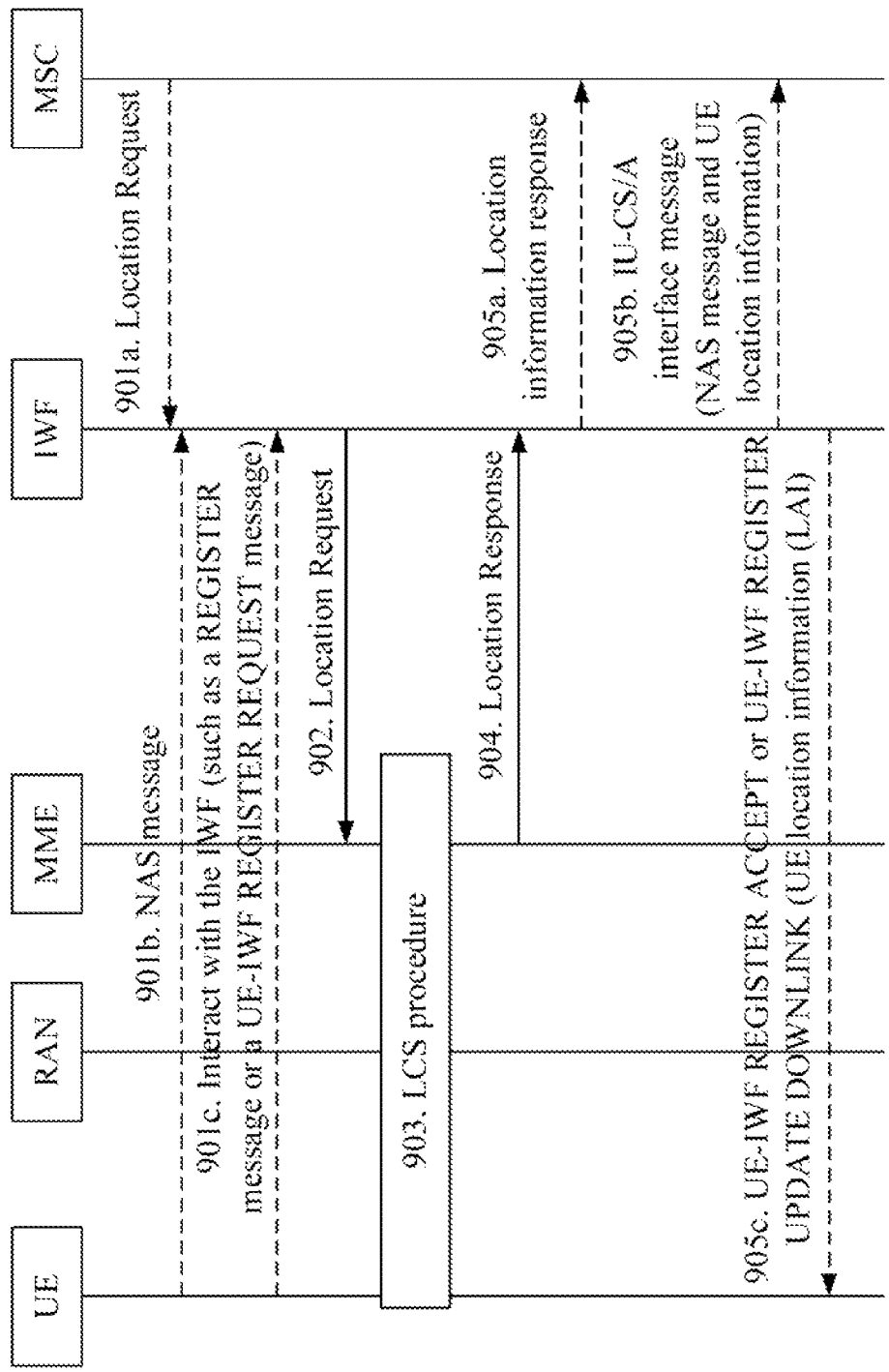
FIG. 9 is a flowchart of a method for obtaining UE location information according to another embodiment of the present invention.

FIG. 9 is a flowchart of a method for obtaining UE location information according to the ninth embodiment. The method includes the following steps:

901. An IWF receives a message sent from a UE or an MSC, and knows it is necessary to obtain the current UE location information according to the message. The application scenario may be one of the following scenarios:

901*a*. The MSC needs to obtain the current UE location information during the location service (LCS) process. The MSC sends a Location Request to the IWF, requesting UE location information, and the IWF obtains the UE location and returns it to the MSC. After the IWF obtains the current UE location information, if the information is the location information of the EPS network, and the MSC requires location information of the CS domain, the IWF converts the location information of the EPS network into location information of the CS domain, and provides the converted location information of the CS domain for the MSC.

901*b*. The UE sends a NAS message (such as a service request message) to the MSC through the IWF, and the IWF needs to send the current UE location information to the MSC; the MSC performs valid mobility management or session management through the UE location information provided by the IWF; in addition, this case is also applicable to the corresponding charging scenario. Specifically, the IWF obtains the current UE location information; if it is the location information of the EPS network, and the MSC requires location information of the CS domain, the IWF provides location information of the CS domain through conversion.

901*c*. The UE executes a register or register update procedure to the IWF; the IWF needs to obtain the current UE location information; during the subsequent interaction with the UE, the IWF provides the UE location information for the UE. If it is the location information of the EPS network, and the UE requires location information of the CS domain, the IWF provides location information of the CS domain of the UE (also known as location information of CSoPS) in the CSoPS architecture for the UE through conversion.

In addition, if the UE provides the current UE location information during the interaction with the IWF, and the IWF needs to verify whether the location information provided by the UE is trusted, the IWF may request the current UE location information from the MME (the location information provided by the MME is trusted). The IWF obtains the UE location information provided by the MME, and compares it with the location information provided by the UE to judge whether the location information provided by the UE is trusted. The time of verifying the location information provided by the UE by the IWF (namely, the time when the IWF needs to trigger the process of verifying whether the location information provided by the UE is trusted) may be decided by the operator.

In the preceding scenarios, the procedure for obtaining the current UE location information from the MME by the IWF is triggered. If the location information of the UE is the location information of the EPS network, but the MSC or UE requires the IWF to provide location information of the CS domain, the IWF executes the conversion function to convert the location information of the EPS network into the location information of the CS domain, and provides the converted location information of the CS domain for the MSC or UE. The specific implementation of the conversion function may be: The IWF configures a mapping relation between the location information of the EPS network and the location information of the CS domain, for example, through the mapping relation, converting the TAI information of the EPS network into the LAI information of the CS domain, or converting the ECGI information of the EPS network into the CGI information of the CS domain.

In addition, the IWF obtains the UE location information provided by the MME, and compares it with the location information provided by the UE to judge whether the location information provided by the UE is trusted.

902. The IWF sends a Location Request to the MME, requesting the MME to provide current UE location information.

A specific implementation may be: The IWF configures the function of a gateway mobile location center (GMLC), for example, supporting the public SLg interface defined between the GMLC and the MME. In this way, the IWF simulates the function of the GMLC, and sends a Location Request to the MME, requesting the MME to execute the UE LCS procedure.

Or, another specific implementation is: The IWF configures the function of an evolved serving mobile location center (E-SMLC), for example, supporting the function of the public SLs interface defined between the MME and the E-SMLC. The IWF simulates the function of the E-SMLC, and sends a Positioning Request message to the MME.

The Location Request or Positioning Request message may carry the IMSI of the UE and quality of service (QoS) information of the LCS. The message may also carry the reporting type. The reporting type indicates the mode of reporting UE location information by the MME. The MME may report the current UE location information, the new cell location information when the cell of the UE is changed, or the location information of the UE reported periodically. The reporting type can also indicate the type of the UE location information reported by the MME, for example, ECGI, TAI/TAI list, or eNodeB ID, which is not limited in this embodiment and may also be indicated by other information elements such as a reporting granularity.

Further, because the IWF needs to send a message to the MME, the address information of the MME needs to be obtained beforehand. The method for the IWF to obtain the address information of the MME that serves the UE may include at least one of the following:

(a) The IWF stores the address information of the MME that serves the UE. For example, when executing the register or register update procedure of the IWF, the UE provides the address information (for example, GUTI or MME ID information, where the GUTI includes the MME ID information) of the MME for the IWF. When it is necessary to address the MME that serves the UE, the IWF addresses the MME that serves the UE through the address information (for example, GUTI or MME ID information) of the MME provided by the UE. The method for addressing the MME by using GUTI or MME ID information may be: performing domain name system (DNS) resolution through the GUTI or MME ID to obtain the address information (IP address information) of the MME.

(b) The IWF configures the address information of the MME, for example, an association between an IWF and an MME.

(c) The IWF requests the address information of the IWF that serves the UE from a home subscriber server (HSS).

903. The MME executes the LCS procedure to obtain location information of the UE. The MME initiates an LCS procedure in the evolved access network, and interacts with the access network device and UE to obtain location information of the UE.

In scenario 901*a*, based on the description of step 902, the IWF may require the MME to report accurate location information (for example, specific latitude or altitude information); the MME receives the information, initiates an LCS procedure in the evolved access network, and interacts with the access network device and UE to obtain the accurate location information of the UE in the evolved access network. For the preceding procedure, see the relevant LCS procedure. The LCS procedure includes the LCS procedure based on the network (not requiring the UE to participate) or the LCS procedure assisted by the UE (requiring the UE to participate).

In scenario 901*b* or 901*c*, based on the description of step 902, the IWF may require that location information of the MME should be based on the cell granularity (such as an ECGI) and/or TAI granularity; the MME may notify the access network to report relevant cell information (ECGI) and/or TAI information of the current UE. For the specific procedure, see the location reporting procedure.

That is, the MME executes the LCS procedure to obtain the current location information of the UE. The location information may be specific location information with high precision, for example, the specific altitude and latitude information of the UE in the LCS procedure, or may be location information of the current EPS network of the UE, for example, the ECGI, TAI, and eNodeB ID.

904. The MME returns a UE location information response to the IWF, where the response carries the current location information of the UE.

According to this embodiment, the IWF obtains UE location information, and during the subsequent interaction with the MSC or UE, the IWF may provide the UE location information for the MSC or UE. The MSC or UE obtains current location information of the UE for guaranteeing the relevant mobility or session management procedure and the charging procedure.

905*a*. The IWF obtains the current location information of the UE (location information of the EPS network or location information of the CS domain); further, if it is the location information of the EPS network, and the MSC requests location information of the CS domain, the IWF provides location information of the CS domain for the MSC through conversion.

905*b*. The IWF obtains the current location information of the UE (location information of the EPS network or location information of the CS domain); further, if it is the location information of the EPS network, and the MSC requests location information of the CS domain, the IWF provides location information of the CS domain for the MSC through conversion, and forwards the NAS message to the MSC.

905*c*. The IWF obtains the current location information of the UE (location information of the EPS network or location information of the CS domain); further, if it is the location information of the EPS network, and the UE requests location information of the CS domain, the IWF provides location information of the CS domain (also known as location information of CSoPS) of the UE in the CSoPS architecture for the UE through conversion.

Figure 10:
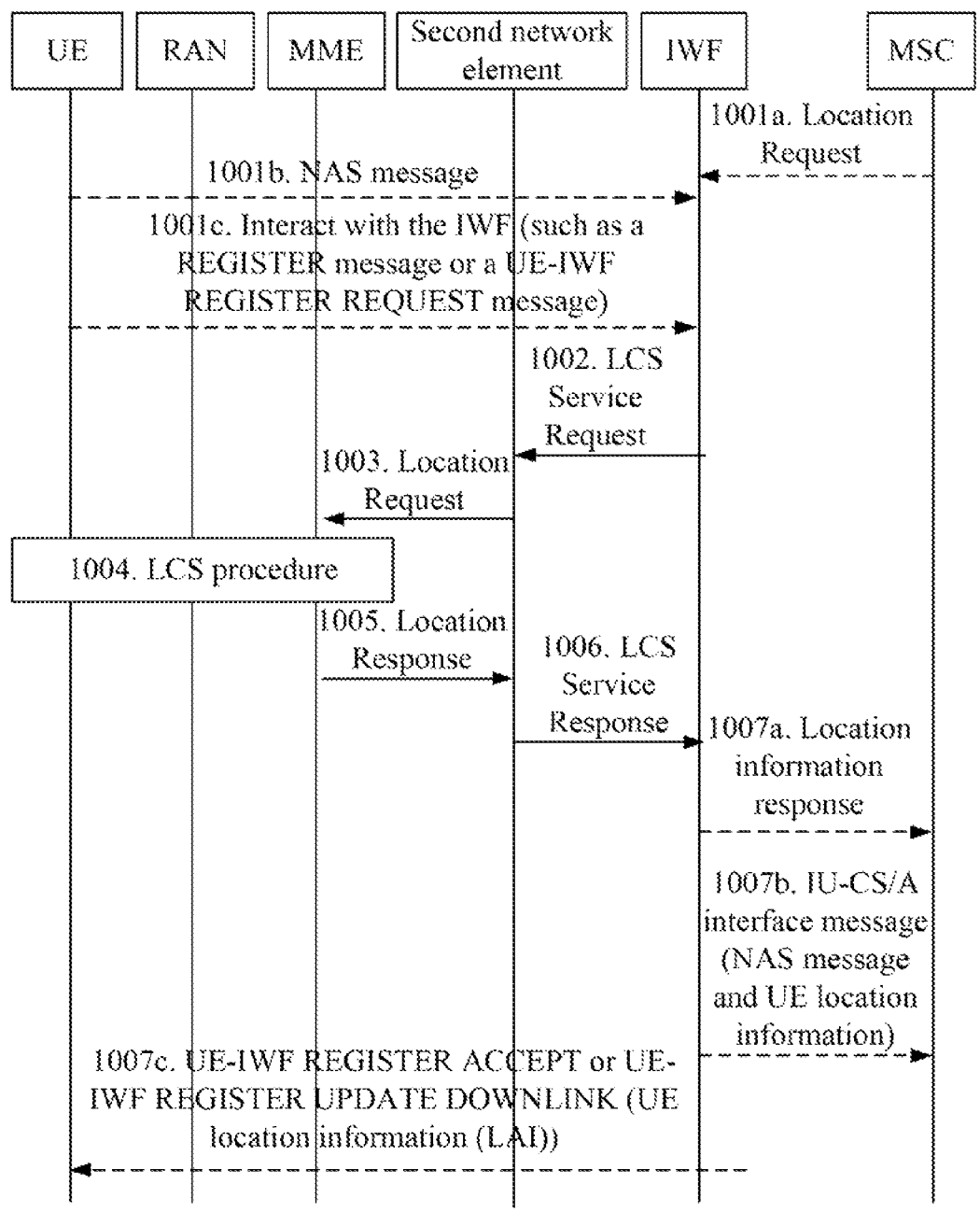
FIG. 10 is a flowchart of a method for obtaining UE location information according to another embodiment of the present invention.

FIG. 10 is a flowchart of a method for obtaining UE location information according to the tenth embodiment. The method includes the following steps:

1001. The IWF receives a message sent from a UE or an MSC, and knows it is necessary to obtain the current UE location information according to the message. The application scenario may be one of the following scenarios:

1001*a*. The MSC needs to obtain the current UE location information during the LCS process. The MSC sends a Location Request to the IWF, requesting UE location information, and the IWF obtains the UE location and returns it to the MSC. After the IWF obtains the current UE location information, if the information is the location information of the EPS network, and the MSC requires location information of the CS domain, the IWF converts the location information of the EPS network into location information of the CS domain, and provides the converted location information of the CS domain for the MSC; or

1001b. The UE sends a NAS message (such as a service request message) to the MSC through the IWF, meanwhile, the IWF needs to send the current UE location information to the MSC; the MSC performs valid mobility management or session management through the UE location information provided by the IWF; in addition, this case is also applicable to the corresponding charging scenario. Specifically, the IWF obtains the current UE location information; if it is the location information of the EPS network, and the MSC requires location information of the CS domain, the JWF provides location information of the CS domain for the MSC through conversion; or

1001c. The UE executes the register or register update procedure to the IWF; the IWF needs to obtain the current UE location information; if it is location information of the EPS network, and the UE requests location information of the CS domain, the IWF provides location information of the CS domain (also known as location information of CSoPS) of the UE in the CSoPS architecture for the UE through conversion. The IWF obtains location information of the UE, and during the subsequent interaction with the UE, provides the UE location information for the UE.

In addition, if the UE provides the current UE location information during the interaction with the IWF, and the IWF needs to verify whether the location information provided by the UE is trusted, the IWF may request the current UE location information from the MME (the location information provided by the MME is trusted). The IWF obtains the UE location information provided by the MME, and compares it with the location information provided by the UE to judge whether the location information provided by the UE is trusted. The time of verifying the location information provided by the UE by the IWF (namely, the time when the IWF needs to trigger the process of verifying whether the location information provided by the UE is trusted) may be decided by the operator.

In the preceding scenarios, the procedure for obtaining the current UE location information from the MME by the IWF through a second network element is triggered. The IWF obtains the current location information of the UE; if the location information of the UE is location information of the EPS network, but the MSC or UE requests location information of the CS domain provided by the IWF, the IWF executes the conversion function to convert the location information of the EPS network into location information of the CS domain, and provides the location information of the CS domain for the MSC or UE.

The specific implementation of the conversion function may be: The IWF configures a mapping relation between the location information of the EPS network and the location information of the CS domain, for example, through the mapping relation, converting the TAI information of the EPS network into the LAI information of the CS domain, or converting the ECGI information of the EPS network into the CGI information of the CS domain.

In addition, the IWF obtains the UE location information provided by the MME, and compares it with the location information provided by the UE to judge whether the location information provided by the UE is trusted.

1002. The IWF sends an LCS Service Request to the second network element. The second network element receives the LCS Service Request sent by the IWF, and executes the procedure for obtaining current location information of the UE from the MME. Here the MME is taken as an example.

The specific implementation may be: The second network element may be a GMLC; the GMLC receives the LCS Service Request sent by the IWF, and executes the procedure for obtaining the current UE location information from the MME. In this case, the IWF is equivalent to a client, and the IWF supports functions of the Le or Lr interface between the client and the GMLC. The IWF simulates the client to send an LCS Service Request to the second network element (GMLC). The GMLC receives the LCS Service Request sent by the IWF and triggers an LCS procedure of the EPS network.

The method for addressing the GMLC by the IWF in the LCS is similar to the method for addressing the GMLC by the client, and is a known technology. The IWF in this method is similar to the client.

Note: A handover selection function (HOSF) may be integrated with the GMLC physically.

1003. The second network element executes the procedure for obtaining the current UE location information from the MME. The second network element sends a Location Request, requesting the MME to provide the current location information of the UE. For the specific implementation, see relevant descriptions in step 902 in FIG. 9.

The method for addressing the MME by the second network element may be:

If the second network element is a GMLC, the method for addressing the MME by the GMLC, as a known technology, is: The GMLC obtains address information of the MME that serves the UE by accessing the HSS.

Note: The IWF may transfer a UE Location Request to the MME through the second network element by interacting with one or more second network elements. The MME executes the UE LCS procedure, obtains location information of the UE, and transfers the location information of the UE to the IWF by interacting with the second network element.

1004. The MME executes the LCS procedure to obtain the location information of the UE. The MME initiates an LCS procedure in the evolved access network, and interacts with the access network device and UE to obtain location information of the UE.

In scenario 1001a, based on the description of step 1003, the IWF may require the MME to report accurate location information (for example, specific latitude or altitude information); the MME receives the information, initiates an LCS procedure in the evolved access network, and interacts with the access network device and UE to obtain the accurate location information of the UE in the evolved access network. For the preceding procedure, see the known relevant LCS procedure. The LCS procedure includes the LCS procedure based on the network (not requiring the UE to participate) or the LCS procedure assisted by the UE (requiring the UE to participate).

In scenario 1001b or 1001c, based on the description of step 1003, the IWF may require that the location information reported by the MME should be based on the cell granularity (such as an ECGI) and/or TAI granularity; the MME may notify the access network to report relevant cell information (ECGI) and/or TAI information of the current UE. For the specific procedure, see the known location reporting procedure.

That is, the MME executes the LCS procedure to obtain the current location information of the UE. The location information may be specific location information with high precision, for example, the specific altitude and latitude information of the UE in the LCS procedure, or may be location information of the current EPS network of the UE, for example, the ECGI, TAI, and eNodeB ID.

1005. The MME returns a UE location information response to the second network element, where the response carries the current location information of the UE.

1006. The second network element returns an LCS Service Response message to the IWF, where the message carries location information of the UE.

According to this embodiment, the IWF obtains UE location information, and during the subsequent interaction with the MSC or UE, the IWF may provide the UE location information for the MSC or UE. The MSC or UE obtains current location information of the UE for guaranteeing the relevant mobility or session management procedure and the charging procedure.

1007a. The IWF obtains the current location information of the UE (location information of the EPS network or location information of the CS domain); further, if it is the location information of the EPS network, and the MSC_requests location information of the CS domain, the IWF provides location information of the CS domain for the MSC through conversion.

1007b. The IWF obtains the current location information of the UE (location information of the EPS network or location information of the CS domain); further, if it is the location information of the EPS network, and the MSC requests location information of the CS domain, the IWF provides location information of the CS domain for the MSC through conversion, and forwards the NAS message to the MSC.

1007c. The IWF obtains the current location information of the UE (location information of the EPS network or location information of the CS domain); further, if it is the location information of the EPS network, and the UE requests location information of the CS domain, the IWF provides location information of the CS domain (also known as location information of CSoPS) of the UE in the CSoPS architecture for the UE through conversion.

Figure 11:
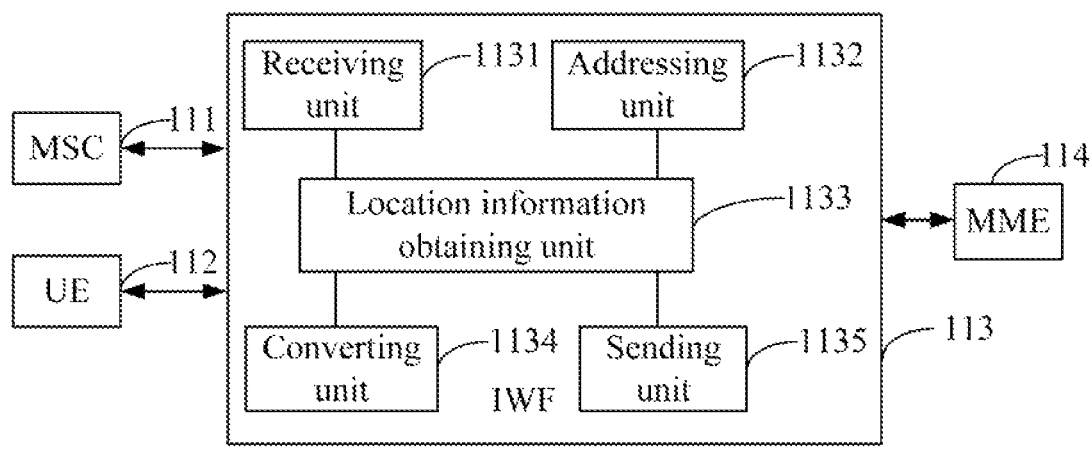
FIG. 11 is a block diagram of a system for obtaining UE location information according to an embodiment of the present invention.

FIG. 11 is a block diagram of another system for obtaining UE location information according to an embodiment of the present invention. The system includes: an MSC 111, a UE 112, an IWF 113, and an MME 114. The IWF 113 further includes: a receiving unit 1131, a location information obtaining unit 1133, and a sending unit 1135.

The receiving unit 1131 is configured to receive a request sent by the UE 112 or MSC 111.

The location information obtaining unit 1133 is configured to interact directly or indirectly with the MME 114 of the core network to obtain location information of the UE 112, that is, the location information obtaining unit 1133 may obtain location information of the UE directly from the MME 114, and may also obtain location information of the UE from the MME through other second devices, such as through the GMLC.

The sending unit 1135 is configured to send location information of the UE 112 to the UE 112 or MSC 111.

The IWF 113 further includes:

an addressing unit 1132, configured to obtain address information of the MME 114, whereupon the location information obtaining unit 1133 is configured to interact with the MME 114 to obtain location information of the UE 112.

The IWF 113 further includes:

a converting unit 1134, configured to convert UE location information of the EPS network obtained by the location information obtaining unit 1133 into UE location information of the CS domain, whereupon the sending unit 1135 is configured to send the converted UE location information of the CS domain to the UE or MSC.

It is understandable to those of ordinary skill in the art that all or part of the steps of the foregoing embodiments may be implemented by hardware instructed by a program. The program may be stored in a computer readable storage medium. When the program is executed, the steps of the methods in the foregoing embodiments are executed, and the storage medium may be any medium that can store program codes, such as a read only memory (ROM), a random access memory (RAM), a magnetic disk and a compact disk-read only memory (CD-ROM).

The preceding specific embodiments further describe the objective, technical solution and merits of the present invention in details. The preceding descriptions are merely exemplary embodiments of the present invention, but not intended to limit the scope of the present invention. Any modification, equivalent replacement, or improvement made without departing from the spirit and principle of the present invention shall fall within the scope of the present invention.

What is claimed is:

1. A method for obtaining user equipment (UE) location information, comprising:

receiving, by an interworking function (IWF), a request sent by a UE for obtaining current UE location information;

receiving, by the IWF, address information of a mobility management entity (MME) of a core network provided by the UE in a register procedure or register update procedure that is initiated to the IWF by the UE;

storing, by the IWF, the address information of the MME;

interacting, by the IWF, with the MME according to the address information of the MME obtain location information of the UE; and sending, by the IWF, the location information of the UE to the UE;

wherein the interacting step comprises:

sending, by the IWF, a request for the location information of the UE to the MME according to the address information of the MME; and receiving, by the IWF, the location information of the UE sent by the MME in response to the request sent by the IWF.

2. The method according to claim 1, wherein the receiving, by the IWF, the request for obtaining current UE location information sent by the UE, comprises:

receiving, by the IWF, one of a UE-IWF REGISTER REQUEST message and a UE-IWF-RC REGISTER UPDATE UPLINK message sent by the UE.

3. The method according to claim 1, further comprising:

initiating, by the MME, a location service (LCS) procedure in an evolved access network, and interacting with an access network device and the UE to obtain UE location information of an evolved packet system (EPS) network; and returning the obtained UE location information of the EPS network to the IWF.

4. The method according to claim 3, further comprising:

converting, by the IWF, the UE location information of the EPS network into UE location information of a circuit switched (CS) domain;

wherein the sending, by the IWF, the location information of the UE to the UE comprises:

sending, by the IWF, the converted UE location information of the CS domain to the UE.

5. A method for obtaining user equipment (UE) location information, comprising:

receiving, by an interworking function (IWF), a request for obtaining current UE location information sent by a mobile switching center (MSC);

receiving, by the IWF, address information of a mobility management entity (MME) of a core network, the address information of the MME being provided by a UE in a register procedure or register update procedure that is initiated to the IWF by the UE;
storing, by the IWF, the address information of the MME; and
interacting, by the IWF, with the MME according to the address information of the MME to obtain location information of the UE; and
sending, by the IWF, the location information of the UE to the MSC;
wherein the interacting, by the IWF, with the MME to obtain the location information of the UE comprises:
 sending, by the IWF, a request for the location information of the UE to the MME according to the address information of the MME; and
 receiving, by the IWF, the location information of the UE sent by the MME in response to the request sent by the IWF.

6. The method according to claim 5, wherein the receiving, by the IWF, the request for obtaining current UE location information sent by the MSC comprises:
receiving, by the IWF, a Location Request message sent by the MSC, wherein the message instructs the IWF to provide location information of the UE to the MSC.

7. The method according to claim 5, further comprising:
initiating, by the MME, a location service (LCS) procedure in an evolved access network, and interacting with an access network device and the UE to obtain UE location information of an evolved packet system (EPS) network; and
returning the obtained UE location information of the EPS network to the IWF.

8. The method according to claim 7, further comprising:
converting, by the IWF, the UE location information of the EPS network into UE location information of a circuit switched (CS) domain;
wherein the sending, by the IWF, the location information of the UE to the MSC comprises:
sending, by the IWF, the converted UE location information of the CS domain to the MSC.

9. A device for obtaining user equipment (UE) location information, comprising:
a receiving unit, configured to receive a request for obtaining current UE location information sent by a UE;
a location information obtaining unit, configured to interact with a mobility management entity (MME) of a core network to obtain location information of the UE;
a sending unit, configured to send the location information of the UE;
an addressing unit, configured to obtain address information of the MME which is provided by the UE in a register procedure or register update procedure that is initiated to the IWF by the UE and store the address information of the MME,
wherein the location information obtaining unit is configured to send a request for the location information of the UE to the MME according to the address information of the MME and receive the location information of the UE sent by the MME in response to the request sent by the location information obtaining unit; and
a converting unit, configured to convert UE location information of an evolved packet system (EPS) network obtained by the location information obtaining unit into UE location information of a circuit switched (CS) domain, wherein the sending unit is configured to send the converted UE location information of the CS domain to the UE.

10. A device for obtaining user equipment (UE) location information, comprising:
a receiving unit, configured to receive a request for obtaining current UE location information sent by a mobile switching center (MSC);
a location information obtaining unit, configured to interact with a mobility management entity (MME) of a core network to obtain location information of the UE; and
a sending unit, configured to send the location information of the MSC;
an addressing unit, configured to obtain address information of the MME which is provided by the UE in a register procedure or register update procedure that is initiated to the IWF by the UE and store the address information of the MME,
wherein the location information obtaining unit is configured to send a request for the location information of the UE to the MME according to the address information of the MME and receive the location information of the UE sent by the MME in response to the request sent by the location information obtaining unit; and
a converting unit, configured to convert UE location information of an evolved packet system (EPS) network obtained by the location information obtaining unit into UE location information of a circuit switched (CS) domain, wherein the sending unit is configured to send the converted UE location information of the CS domain to the MSC.

* * * * *

UNITED STATES PATENT AND TRADEMARK OFFICE
CERTIFICATE OF CORRECTION

PATENT NO. : 8,301,165 B2
APPLICATION NO. : 13/195415
DATED : October 30, 2012
INVENTOR(S) : Weihua Hu, Zhongping Chen and Wenfu Wu It is certified that error appears in the above-identified patent and that said Letters Patent is hereby corrected as shown below:

In claim 1, column 22, line 27, "MME obtain", should read -- MME to obtain --

Signed and Sealed this
Nineteenth Day of March, 2013

Teresa Stanek Rea
*Acting Director of the United States Patent and Trademark Office*